United States Patent
Stack et al.

(10) Patent No.: US 10,095,877 B2
(45) Date of Patent: Oct. 9, 2018

(54) SYSTEMS AND METHODS FOR AUTHENTICATING PHOTOGRAPHIC IMAGE DATA

(71) Applicant: TRUEPIC INC., La Jolla, CA (US)

(72) Inventors: Craig Stack, La Jolla, CA (US); Jason Lyons, Arlington, VA (US); Francis Lyons, Purcellville, VA (US)

(73) Assignee: TruePic Inc., La Jolla, CA (US)

( * ) Notice: Subject to any disclaimer, the term of this patent is extended or adjusted under 35 U.S.C. 154(b) by 0 days.

(21) Appl. No.: 15/065,781

(22) Filed: Mar. 9, 2016

(65) Prior Publication Data
US 2017/0041306 A1    Feb. 9, 2017

Related U.S. Application Data
(63) Continuation of application No. 14/816,712, filed on Aug. 3, 2015, now Pat. No. 9,300,678.

(51) Int. Cl.
| | |
|---|---|
| *G06F 21/62* | (2013.01) |
| *G06F 21/64* | (2013.01) |
| *H04L 29/06* | (2006.01) |

(52) U.S. Cl.
CPC ........ *G06F 21/6218* (2013.01); *G06F 21/645* (2013.01); *H04L 63/08* (2013.01);
(Continued)

(58) Field of Classification Search
None
See application file for complete search history.

(56) References Cited

U.S. PATENT DOCUMENTS
| | | |
|---|---|---|
| 5,351,134 A | 9/1994 | Yaguchi |
| 6,411,725 B1 | 6/2002 | Rhoads |

(Continued)

FOREIGN PATENT DOCUMENTS
| | | |
|---|---|---|
| WO | 2017023896 | 2/2017 |

OTHER PUBLICATIONS
The TCP/IP Guide, tcpipguide.com, 2005, pp. 1-4.*
(Continued)

*Primary Examiner* — Benjamin E Lanier
(74) *Attorney, Agent, or Firm* — Sheppard Mullin Richter & Hampton LLP

(57) ABSTRACT

The present disclosure provides systems and methods for authenticating photographic data. In one embodiment, a method comprises providing an image authentication application for use on a client device, the application configured to control image capture and transmission; receiving an image data file from the application at the authentication server comprising a photographic image captured by the application and metadata associated therewith; applying a watermark to the photographic image to create a watermarked image; applying date and time information to the tagged image; applying location information to the tagged image; creating a web address associated with the image data file; uploading the photographic image, the tagged image, or both to the web address; and transmitting an authenticated image file to the client device, the authenticated image file comprising one or more of: the watermarked image, the photographic image, the date and time information, geographic information, and the web address.

36 Claims, 6 Drawing Sheets

(52) U.S. Cl.
CPC .......... *H04L 63/102* (2013.01); *H04L 63/123* (2013.01); *H04L 2463/121* (2013.01)

(56) References Cited

U.S. PATENT DOCUMENTS

| | | |
|---|---|---|
| 6,487,301 B1 | 11/2002 | Zhao |
| 6,628,417 B1 | 9/2003 | Naito |
| 6,947,571 B1 | 9/2005 | Rhoads |
| 7,209,571 B2 | 4/2007 | Davis |
| 7,616,777 B2 | 11/2009 | Rodriguez |
| 8,121,342 B2 | 2/2012 | Davis |
| 8,413,882 B1 | 4/2013 | Nidamarthi |
| 8,849,819 B2 | 9/2014 | Johnson |
| 8,868,039 B2 | 10/2014 | Rodriguez |
| 9,300,678 B1 | 3/2016 | Stack |
| 9,614,886 B2 | 4/2017 | Zhong |
| 9,621,565 B2 | 4/2017 | Stack |
| 9,832,017 B2 | 11/2017 | Malone |
| 2003/0065922 A1 | 4/2003 | Fredlund |
| 2004/0039912 A1 † | 2/2004 | Borrowman et al. |
| 2004/0091111 A1 | 5/2004 | Levy |
| 2004/0153649 A1 | 8/2004 | Rhoads |
| 2006/0018506 A1 | 1/2006 | Rodriguez |
| 2006/0036864 A1 | 2/2006 | Parulski |
| 2006/0120562 A1 | 6/2006 | Fudge |
| 2006/0157559 A1 | 7/2006 | Levy |
| 2007/0019836 A1* | 1/2007 | Thorwirth ............. G06T 1/0028 382/100 |
| 2007/0091376 A1 | 4/2007 | Calhoon |
| 2007/0171288 A1 | 7/2007 | Inoue |
| 2009/0044235 A1* | 2/2009 | Davidson ............... G06Q 30/06 725/87 |
| 2009/0320101 A1* | 12/2009 | Doyle, III ............... G06F 21/31 726/4 |
| 2010/0046748 A1 | 2/2010 | Kusnoto |
| 2010/0250953 A1 | 9/2010 | Wiersma |
| 2010/0317399 A1 | 12/2010 | Rodriguez |
| 2011/0087690 A1 | 4/2011 | Cairns |
| 2011/0156879 A1* | 6/2011 | Matsushita ............. H04L 63/08 340/10.1 |
| 2012/0311623 A1 | 12/2012 | Davis |
| 2013/0041948 A1 | 2/2013 | Tseng |
| 2014/0049653 A1 † | 2/2014 | Leonard et al. |
| 2014/0081932 A1 | 3/2014 | Krislov |
| 2014/0198687 A1 | 7/2014 | Raleigh |
| 2014/0244781 A1 | 8/2014 | Klayko |
| 2014/0279493 A1 | 9/2014 | Kamath |
| 2014/0297810 A1 | 10/2014 | Zhong |
| 2014/0324986 A1 | 10/2014 | Zhang |
| 2014/0358964 A1 | 12/2014 | Woods |
| 2015/0016661 A1 | 1/2015 | Lord |
| 2015/0142595 A1* | 5/2015 | Acuna-Rohter ....... G06Q 20/40 705/21 |
| 2015/0154436 A1 | 6/2015 | Shi |
| 2015/0213324 A1 | 7/2015 | Farid |
| 2017/0041328 A1 | 2/2017 | Stack |
| 2017/0118493 A1 | 4/2017 | Hain |
| 2017/0180277 A1 | 6/2017 | Brady |
| 2017/0374622 A1 | 12/2017 | Visuri |
| 2018/0026932 A1 | 1/2018 | Wang |

OTHER PUBLICATIONS

International Patent Application No. PCT/US2016/045089, an International Search Report and Written Opinion issued by Authorized Officer Lee W. Young, dated Oct. 21, 2016, 8 pages.

\* cited by examiner
† cited by third party

SYSTEMS AND METHODS FOR AUTHENTICATING PHOTOGRAPHIC IMAGE DATA

CROSS-REFERENCE TO RELATED APPLICATIONS

This application is a continuation of U.S. patent application Ser. No. 14/816,712, filed Aug. 3, 2015, the entirety of which is incorporated by reference herein.

TECHNICAL FIELD

The present disclosure relates to systems and methods for authenticating photographic image data, including a software application for controlling photography on a client device and metadata associated therewith and an authentication server for receiving data therefrom.

BACKGROUND OF THE INVENTION

Digital photography has grown steadily since its introduction. Social networks and mobile computing devices have further accelerated the growth of photographic data made available to the public. The ability to take and share photographs anytime and anywhere has resulted in the general public consuming more photographic data than ever and relying on these photographs for up to the minute information. However, it is a well-known fact that digital photographs are easily edited and the information contained within a digital photograph may not be entirely trustworthy.

SUMMARY OF THE INVENTION

One aspect of the invention relates to a software application that resides on a client device (e.g., a smart phone or other client device) for controlling various aspects of photography on the client device where authentication of photos is desired, an authentication server for receiving a photo and associated data therefrom and creating an authenticated photo and a website for storing the authenticated photos and which enables users who subsequently receive a copy of the photo to determine if it is an authentic photo. Collectively, the image authentication application and authentication server are configured to be operable to control the taking of photos to be authenticated and the association of metadata with those photos. The image authentication application may require users, desiring to generate an authenticated photo, to invoke the image authentication application to take a picture. The image authentication application and authentication server include functionality to reduce the likelihood of alteration of metadata associated with a picture taken under control of the application.

Once a picture is taken under control of the image authentication application, it is sent from the image authentication application to the authentication server. The image authentication application may prevent a photo that has been taken from being edited or sent from the image authentication application to any location other than the authentication server. This helps prevent alteration of the photo.

The image authentication application (in conjunction with the authentication server) may also facilitate the authenticity of metadata associated with the photo.

According to one aspect, the image authentication application may require a user to grant access to the device's geolocation data when opening the app for the first time (and/or at other times). The image authentication application may track the device's position as long as the app is active using geolocation capabilities on the client device. This helps prevent and/or enables detection of alterations to the location metadata.

To take a picture the user may be required to open the image authentication application (if it is not already open on the device). After taking a picture using the image authentication application and selecting to use the photo, the image will be transmitted to the authentication server along with various metadata, such as geographic information, e.g., the user's current latitude/longitude, time data if desired and/or other metadata.

According to one aspect, the time at which the image is received by the server is recorded. This helps prevent alteration of the time metadata associated with the photo. In various prior approaches to photo authentication, the time data is generated solely by the client device. A problem with these prior approaches is that users can alter the system time of the client device.

The user's latitude/longitude may be used to determine address and nearby places of interests. If places of interest are found, the user will be prompted to tag their image with that location name. Users will also be given the option of removing the address/location information all together. However, the application may prevent users from adding or modifying location information.

In certain embodiments, the application may include a feature to ensure that the time delay between opening the application and/or taking a photo in the image authentication application and sending the image to the authentication server is within an approved time frame. Similarly, the image authentication application may include a feature to ensure that the location at which a photograph was taken is within an approved distance limitation from the location from which the user transmits the photograph to the authentication server.

According to another aspect, the authentication server performs various steps to facilitate authentication of photos received from the application. When a photo is received, the authentication server may assign it a unique resource locator (e.g., a unique web address). The authenticated image (or a version of the authenticated image), and associated metadata, is stored on the authentication server. The unique resource locator (e.g., a web address or a web address proxy such as a bitly code or a tinyURL) may be provided along with the authenticated image for third party verification of the image. The website (and/or other distribution infrastructure) will allow third parties to check and reference the authenticated image to verify that it is authentic. The authentication server may host and/or be in communication with the website. Any third party can visit the authentication server website to look up the authenticated image they have been provided and to make sure that the picture they are viewing is also on the website. This insures that the image provided to the third party viewer has, in fact, been authenticated by the authentication server.

The features disclosed herein may be applied to videos as well as images.

In certain embodiments, a block chain server system may be implemented such that multiple authentication servers store and maintain authenticated image information.

The present disclosure may be embodied in a method comprising providing an image authentication application for use on a client device, the image authentication application configured to control image capture and image transmission by the client device; receiving an image data file from the image authentication application at an authentication server, the image data file comprising a photographic image captured by the image authentication application on the client device and metadata associated with the photographic image; applying an authentication indicator to the photographic image to create a tagged image at the authentication server; applying date and time information to the tagged image at the authentication server; creating a resource location identifier associated with the image data file, the resource location identifier identifying a file location; uploading the photographic image, the tagged image, or both to the file location identified by the resource location identifier; and transmitting an authenticated image file to the client device, the authenticated image file comprising one or more of: the tagged image, the photographic image, the date and time information, and the resource location identifier.

In one aspect of this embodiment, the method may further comprise using the metadata to verify that the image data file has satisfied one or more timing requirements. The one or more timing requirements may comprise a requirement that the image data file was received at the authentication server within a predetermined time frame after the photographic image was captured by the image authentication application. Alternatively, or in addition, the one or more timing requirements may comprise a requirement that the image data file was received at the authentication server within a predetermined time frame after the image authentication application was opened on the client device.

In another aspect of this embodiment, receipt of the image data file from the application indicates that the image authentication application has verified that the image data file has satisfied one or more timing requirements. The one or more timing requirements may comprise a requirement that the image authentication application received a request to transmit the image data file to the authentication server within a predetermined time frame after the photographic image was captured by the image authentication application. Alternatively, or in addition, the one or more timing requirements may comprise a requirement that the authentication application received a request to transmit the image data file to the authentication server within a predetermined time frame after the image authentication application was opened on the client device.

In another aspect of this embodiment, the authenticity indicator may comprise a visual watermark applied to the photographic image.

The present disclosure may also be embodied in a method comprising opening an image authentication application on a client device; capturing a photographic image using the image authentication application; transmitting the photographic image to an authentication server using the image authentication application; receiving an authenticated image file on the client device from the authentication server; and sharing the authenticated image file. The authenticated image file may comprise an authenticated image that has been authenticated by the authentication server; authenticated date and time information provided by the authentication server and associated with the authenticated image; and a resource location identifier associated with the authenticated image identifying a file location, wherein a third party viewer may visit the file location to view the photographic image, the authenticated image, or both.

In one aspect of this embodiment, the image authentication application may prevent editing of the photographic image, and exporting of the photographic image except to the authentication server.

In another aspect of this embodiment, the authenticated image may comprise a watermark indicating that the authenticated photo has been authenticated by the authentication server.

In another aspect of this embodiment, the method may further comprise recording time information corresponding to when the image authentication application was opened on the client device; and before transmission of the photographic image to the authentication server, confirming that transmission of the photographic image to the authentication server is occurring within a predetermined time frame after the image authentication application was opened on the client device.

In another aspect of this embodiment, the method may further comprise recording time information corresponding to when the photographic image was captured using the image authentication application; and before transmission of the photographic image to the authentication server, confirming that transmission of the photographic image to the authentication server is occurring within a predetermined time frame after the photographic image was captured using the image authentication application.

The present disclosure may also be embodied in a photographic data authentication system, the system comprising a client device having an image authentication application; and an authentication server in communication with the client device over a wide area network. The image authentication application on the client device may be configured to capture a photographic image, receive a command to transmit the photographic image to the authentication server, determine whether the command to transmit the photographic image to the authentication server satisfies one or more time or geographic restrictions, and if the one or more time or geographic restrictions are satisfied, transmit the photographic image to the authentication server for authentication. The authentication server may be configured to apply authenticated time and date information to the photographic image, apply an authentication indicator to the photographic image to create an tagged image, create a resource location identifier associated with the authenticated image, the resource location identifier specifying a file location, and transmit an authenticated image file to the client device. The authenticated image file may comprise the tagged image, the authenticated time and date information, and the resource location identifier.

In one aspect of this embodiment, the one or more time or geographic restrictions may comprise a restriction that the image authentication application must receive a request to transmit the photographic image to the authentication server within a predetermined time frame after the image authentication application is opened on the client device.

In another aspect of this embodiment, the one or more time or geographic restrictions may comprise a restriction that the image authentication application must receive a request to transmit the photographic image to the authentication server within a predetermined time frame after the photographic image has been captured by the image authentication application.

The present disclosure may also be embodied in a method comprising: receiving a watermarked image, the watermarked image comprising a photographic image and a watermark indicating that the photographic image has been authenticated by an authentication server; receiving a web address associated with the watermarked image, the web address displaying the watermarked image, the photographic image, or both; and visiting the web address to verify the authenticity of the watermarked image.

In one aspect of this embodiment, receiving the web address may comprise receiving a shortened representation of the web address, and/or a OR code representation of a web address.

In another aspect of this embodiment, the method may further comprise receiving authenticated metadata associated with the watermarked image, and visiting the web address to verify the authenticated metadata.

The present disclosure may also be embodied in non-transitory computer readable medium comprising an instruction set configured to command a computing device to carry out the methods described herein.

These and other features and advantages of the invention should become more readily apparent from the detailed description of the preferred embodiments set forth below taken in conjunction with the accompanying drawings, which illustrate, by way of example, the principles of the disclosure.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION

The present disclosure provides systems and methods for authenticating photographic image data. One advantage of the disclosed systems and methods is that users are able to authenticate photographic image data so that the user can have some level of assurance that the information contained within a photographic image is accurate.

Figure 1:
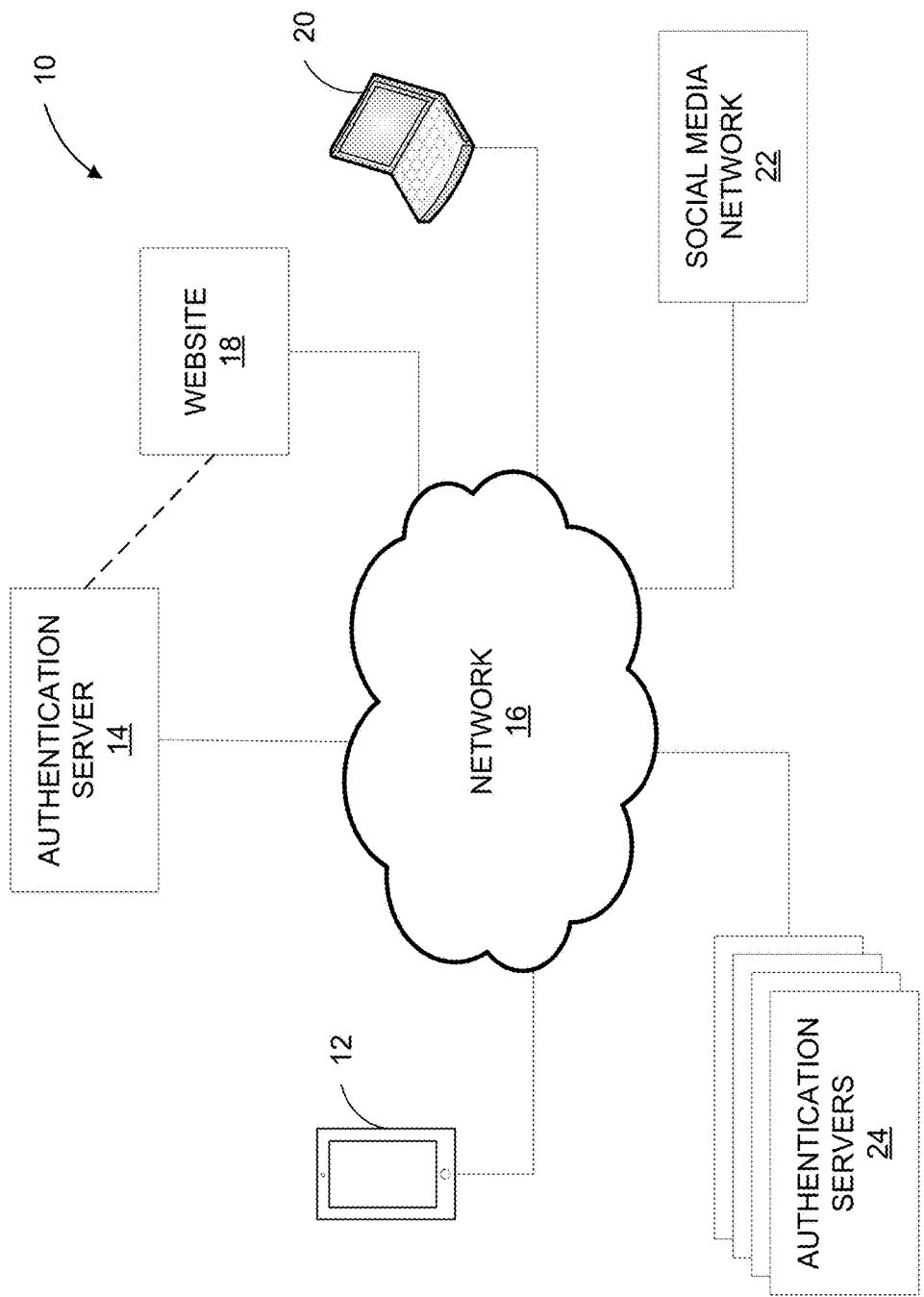
FIG. 1 provides a perspective view of a photographic image data authentication system, in accordance with an embodiment of the present disclosure.

Referring now to the figures, FIG. 1 provides a block diagram of a photographic image data authentication system 10. The system 10 comprises a client device 12, an authentication server 14, and a network 16. The client device 12 includes a camera capable of taking digital images and/or videos, and an image authentication application resides on the client device 12 for controlling various aspects of photography on the client device where authentication of photographic images is desired. In FIG. 1, the client device 12 is shown as a mobile device having a camera. However, it should be understood that the client device 12 may be any device capable of taking digital photographic images, including, but not limited to, cell phones, smart phones, tablets, other mobile devices, digital cameras, web cameras, laptop computers, desktop computers, security cameras, televisions, monitors, and the like. The client device 12 is connected to the authentication server 14 over the network 16. In certain embodiments, the network 16 may be a wide area network, such as the Internet.

When a user wishes to take an authenticated image, the user opens the image authentication application on the client device 12 to capture an image. Once the user captures an image using the image authentication application on the client device 12, the image along with any associated metadata (collectively referred to as the "image file") is transmitted over the network 16 to the authentication server 14 for authentication. The authentication server performs various tasks to authenticate the image file, thereby providing third-parties some level of assurance that the authenticated image file is unaltered and reliable. Metadata associated with an image may include a time-stamp (i.e., what time the photograph was taken), a date-stamp (i.e., the date on which the photograph was taken), and geographic information (i.e., the location in which the photograph was taken). Once the image file is verified and authenticated by the authentication server, a watermarked image and authenticated metadata (collectively referred to as the "authenticated image file") are transmitted back to the client device. The authenticated image file may be shared with third-party viewers (e.g., remote user 20 and social media network 22). The authenticated image file may also be uploaded to a website 18 hosted by the authentication server 14 for further verification of the authenticated image file. Third-party viewers who have received the authenticated image file can visit the website 18 to confirm that the authenticated image file has been verified by the authentication server and has not been changed in any way. In certain embodiments, rather than authentication occurring at a single server 14, a block chain server arrangement may be utilized so that authentication may occur at numerous servers 24 located in various locations on the network 16.

Figure 2:
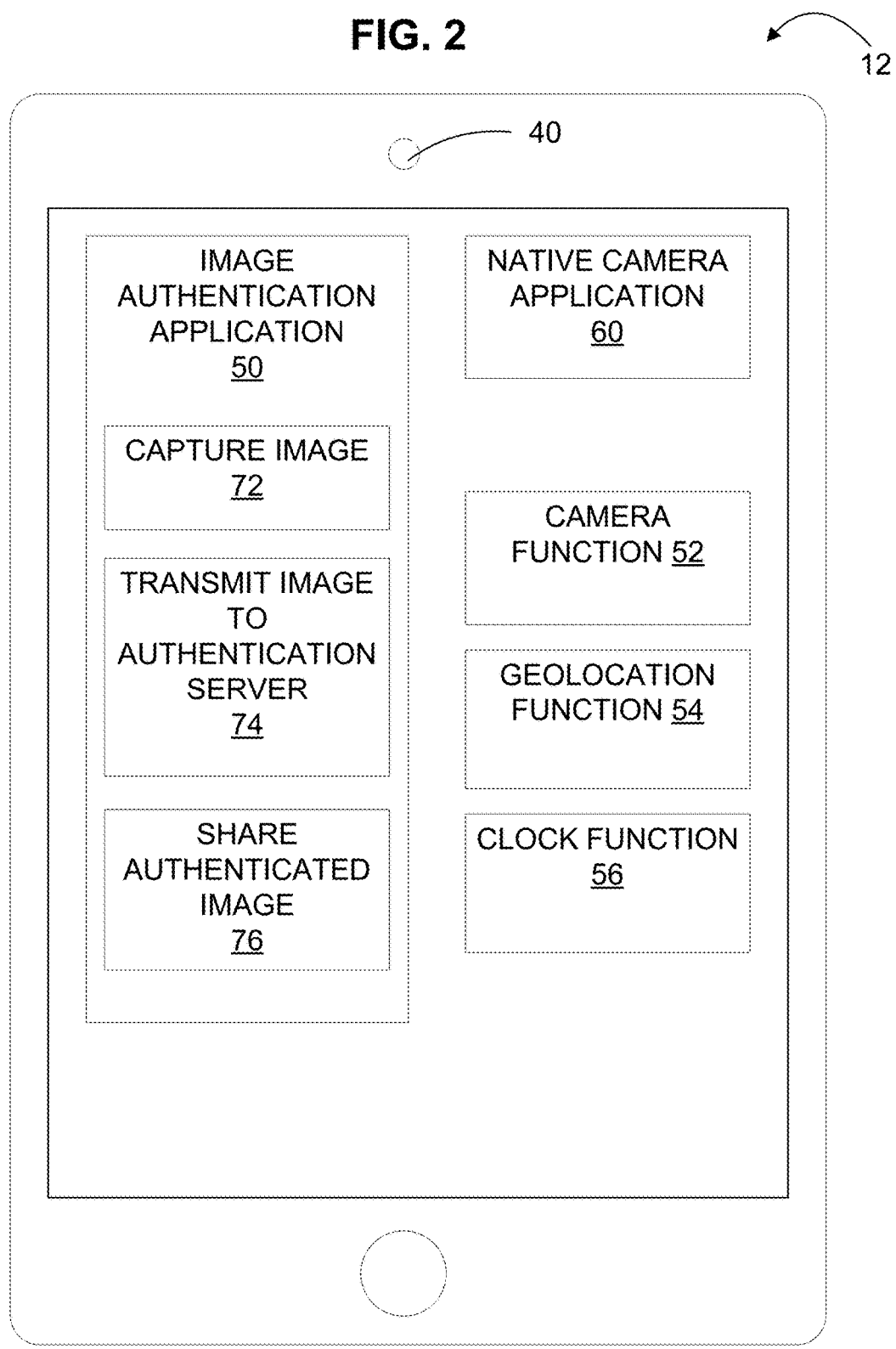
FIG. 2 provides a block diagram representation of a client device having an image authentication application, in accordance with an embodiment of the present disclosure.

FIG. 2 provides a block diagram of an exemplary client device 12. The client device 12 comprises a camera 40 that is controlled by a camera function 52. The client device 12 also comprises a geolocation function 54 for tracking the location of the client device 12 and a clock function 56 for keeping track of time. Residing on the client device 12 are an image authentication application 50 and a native camera application 60. The native camera application 60 may be used to capture images that a user wishes to edit and/or do not need authentication. The image authentication application 50 may be used when a user wishes to capture and share authenticated images. The image authentication application 50 is given access to the camera function 52 (to capture images), the geolocation function 54 (for creating geographic metadata associated with images), and the clock function 56 (for creating time-based metadata associated with images). A user can use the image authentication application 50 to capture an image (72), transmit the image to the authentication server (74), and share an authenticated image (76). These functions are described in greater detail below.

It should readily be appreciated that authenticated images can be beneficial and useful in many different applications. By way of example, authenticated images can be used by dating websites, social networks, casting directors, and the like to ensure accurate and recent images of users. Parents may use authenticated images to verify the whereabouts and activities of their children or employers the whereabouts of their employees. Social media users can share experiences and users can view friends' images with full faith that the image is an accurate representation of their activities. Delivery services can provide reliable package tracking and location information. Customers making online purchases or reservations can verify the condition of the item they are purchasing or the item/property/vehicle they are renting. News outlets can verify source image information. Witnesses to a crime or accident can provide reliable, verifiable images taken at the scene. These are but a few of the myriad of uses that are possible with authenticated images.

Although a broad overview of the systems and methods have been provided in describing FIGS. 1 and 2, various aspects of the authentication process are described in greater detail below with reference to FIGS. 3, 4, and 5.

Figure 3:
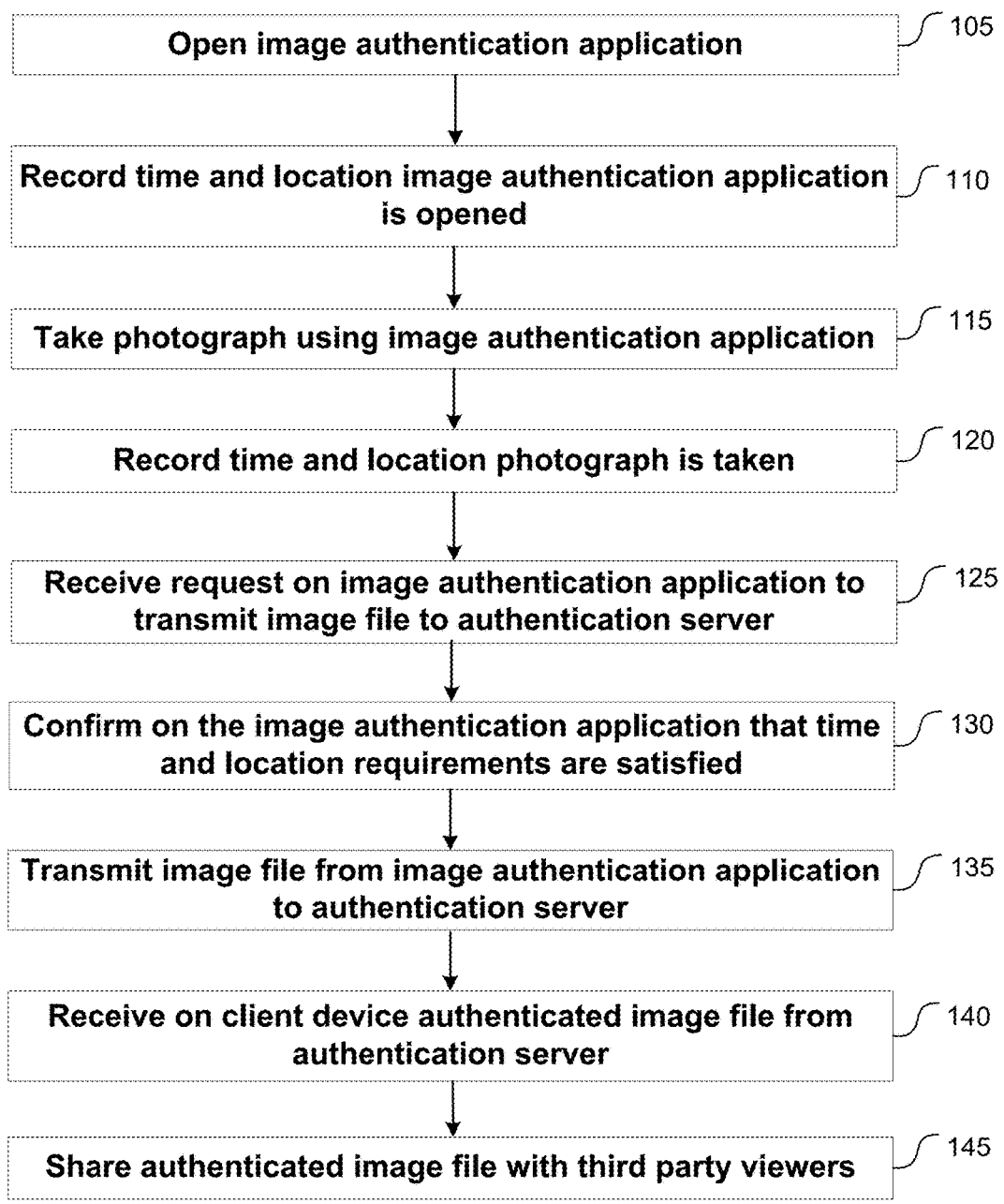
FIG. 3 provides a flow-chart depiction of a photographic image data authentication process from the perspective of a client device, in accordance with an embodiment of the present disclosure.
Figure 4:
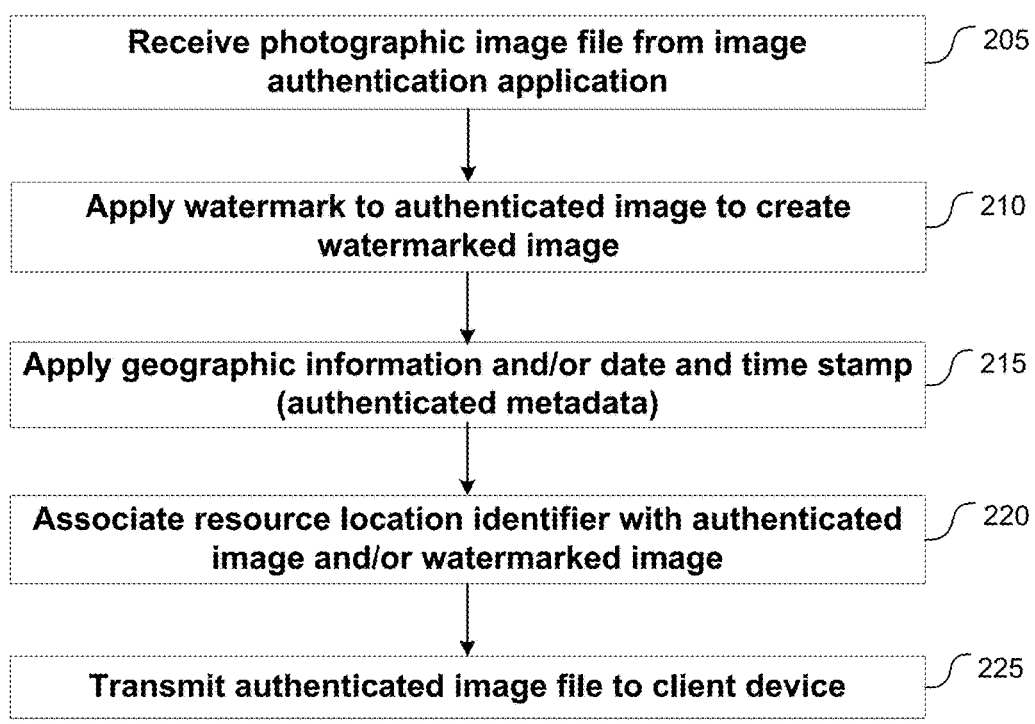
FIG. 4 provides a flow-chart depiction of a photographic image data authentication process from the perspective of a photographic image data authentication server, in accordance with an embodiment of the present disclosure.
Figure 5:
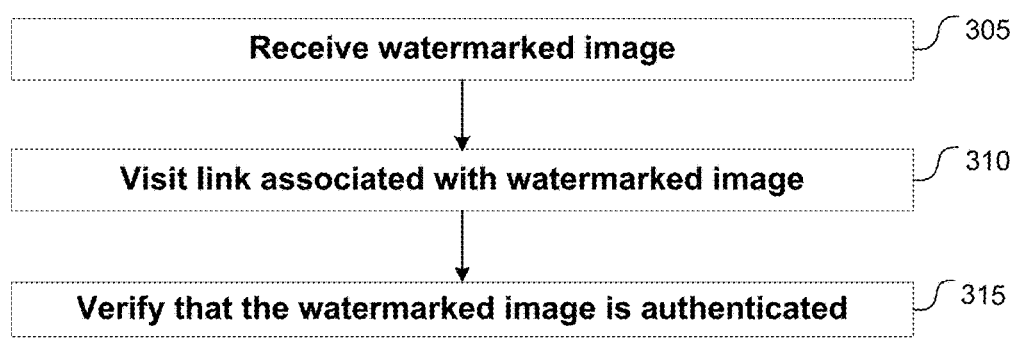
FIG. 5 provides a flow-chart depiction of a photographic image data authentication process from the perspective of a third-party recipient of an authenticated image, in accordance with an embodiment of the present disclosure.
Figure 6:
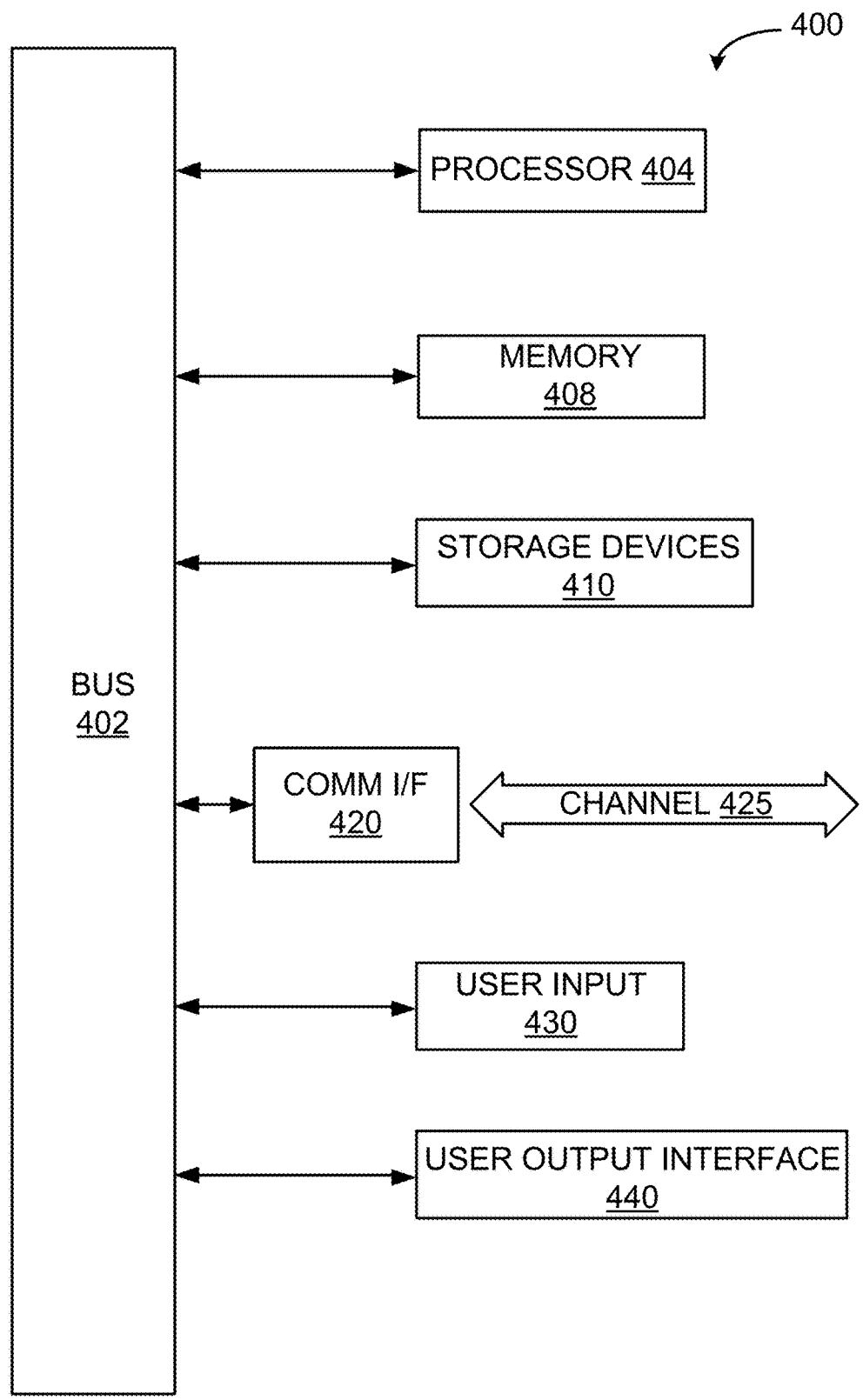
FIG. 6 illustrates a sample computing module that may be used to implement certain features and embodiments of the present disclosure.

FIGS. 3, 4, and 5 provide method flow charts for carrying out certain embodiments of photographic image authentication processes from the perspective of the client device 12, the authentication server 14, and third party viewers, respectively.

FIG. 3 provides a flow chart depiction of an image authentication process from the perspective of the client device 12. As stated above, an image authentication application resides on the client device 12 for taking, authenticating, and sharing photographic images. At block 105, the image authentication application is opened on the client device. When it is opened, the image authentication application may record the time that the image authentication application is opened, and the geographic location of the client device at the time the image authentication application is opened (block 110). This information may be used in later steps to ensure that the photograph has not been edited. A user then captures an image using the application (block 115). Again, the time that the image is captured and/or the geographic location of the client device at the time the image was captured may be recorded (block 120). The time and location information recorded in blocks 110 and 120 may be associated with and/or applied to the image as metadata. The time and location metadata and any other metadata associated with the image may be grouped together into an image file. The image authentication application then receives a request from the user to transmit the image file to the application server (block 125). In certain embodiments, this "request" may be an indication by the user that the user wishes to authenticate the image file or to use the image as an authenticated image.

When a user indicates a desire to authenticate the image file, the image authentication application may take one or more steps to confirm that the user has not had the opportunity to edit the image file by ensuring that certain time and/or geographic restrictions are satisfied (block 130). For example, the image authentication application may note the time at which the image authentication application was opened (from block 110), and the time at which the request to transmit the image file is made (block 125). If the request to transmit the image file is made sufficiently soon after the image authentication application is opened (for example, within one minute), then one can be fairly certain that the user has not had a chance to edit the image file in that short time. In certain embodiments, the image authentication application may also compare the geographic location of the client device at the time the image authentication application was opened (from block 110) and the geographic location of the client device at the time the user requests transmission of the image to the authentication server (block 125) to ensure that the user has not moved a great distance (e.g., less than 200 feet). Similarly, time and/or geographic information recorded when the image was captured (from block 120) may be used and compared to time and/or geographic information when the request to transmit the image file is made (block 125). These time and geographic requirements help to ensure that the user has not had sufficient time to edit the image file.

Additional restrictions may be placed by the image authentication application to assist in this authentication process. For example, the image authentication application may only allow images taken within the image authentication application to be transmitted to the authentication server. The image authentication application may also prohibit the use of any editing tools within the image authentication application, or to prohibit exporting of images so that the user cannot export images to another program for editing. In this way, the image authentication application ensures that the image file has remained within the approved application environment for the entirety of the image file's existence, and that the user has not been given the opportunity to revise any portion of the image file, including the image itself or the associated metadata.

Once the image authentication application has confirmed that the image file satisfies any time or geographic restrictions, the image file is transmitted from the image authentication application to the authentication server (block 135). For example, as discussed above, the image file may include the image itself as well as the geographic coordinates at the time the photograph was taken and/or at the time the application was opened and/or at the time the transmission request was made may be transmitted to the authentication server (i.e., geographic metadata). In certain embodiments, the time and date information recorded at any of the aforementioned events may also be transmitted to the authentication server (i.e., time metadata). Once the authentication server has gone through its processes (described below in FIG. 4), the client device receives a watermarked image and authenticated metadata (collectively, the authenticated image file) from the authentication server (block 140). As will be described in greater detail below, the authenticated image file may include authenticated metadata provided by the authentication server, such as a server-applied time stamp, date stamp, and geographic information. The authenticated image file may also include a resource location identifier associated with the authenticated image file. In certain embodiments, this resource location identifier may be a web address or a representation of a web address (e.g., bitly code, tinyURL, or QR code). In this scenario, the authenticated image file, or certain portions of the authenticated image file may be uploaded to a website viewable by third parties. The user can share the authenticated image file with third party viewers (block 145) to represent that the image being shared has not been edited or revised. Third party viewers can view the authenticated image file and access the web address to confirm that the image has been verified by the authentication server and has not been revised.

In certain embodiments, the authenticated image file may comprise any combination of an authenticated image (i.e., the original image once it has been verified by the authentication server), authenticated image metadata (e.g., authentication server-provided or authentication server-approved timestamp, datestamp, and geographic data), and/or a watermarked image, the watermarked image being the authenticated image with a visual watermark affixed to it to represent that it has been verified by the authentication server.

Turning now to FIG. 4, the photographic image data authentication process is described from the perspective of the authentication server 14. In block 205, the authentication server 14 receives a photographic image file (i.e., image and metadata) from the image authentication application. For example, as discussed above, the authentication server may receive time information (e.g., time/date when application was opened, time/date when photograph was taken, and/or time/date application received request to transmit photograph to authentication server), and/or geographic information (e.g., coordinates when application was opened, coordinates when photograph was taken, and/or coordinates when application received request to transmit photograph to authentication server). As discussed above with reference to block 130 of FIG. 3, the process confirms that certain time and/or geographic restrictions are satisfied by the image file. As discussed above, by ensuring that the user has not had an opportunity to edit the photograph (e.g., by ensuring that less than a minute has passed since the user took the photo and transmitted it to the authentication server), the authenticity of the photo can be presumed with reasonable certainty. Once it is confirmed that these restrictions are satisfied and the image file is received by the authentication server, the photographic image (part of the photographic image file) becomes an authenticated image. While FIGS. 3 and 4 depict that the client device determines whether or not the time/geographic restrictions are satisfied, it is possible that this determination can be performed by the client device, the authentication server, or both. In block 205 of FIG. 4, the photographic image has satisfied the time and geographic restrictions and has been received by the authentication server. As such, the image has been authenticated.

In block 210, the authentication server applies an authentication indicator to the authenticated image. The authentication indicator may be any indicator that the image has been authenticated by the authentication server. A common example that was discussed above is applying a watermark to the authenticated image to create a watermarked image. Although the example of a watermarked image is used throughout this disclosure as an exemplary embodiment, it should be understood that instead of a watermark, any other authentication indicator may be used (e.g., a metadata tag indicating authentication, or other visual and/or audio indicators).

In block 215, authenticated metadata is then applied to the authenticated image, the watermarked image, or both. This authenticated metadata may comprise time metadata and/or geographic metadata provided by or verified by the authentication server. For example, the authenticated metadata applied to the authenticated image and/or the watermarked image may comprise a time and date stamp provided by the authentication server. The authentication server applies the time and date stamp so as to avoid the possibility that the user has tampered with time and date settings on the client device. The authentication server may use a reliable time and date reading independent of the client device and outside the reach of the user to tag the authenticated image with authenticated time and date information. The time and date applied to the authenticated image may be the time and date that the authentication server received the original photograph.

The authenticated metadata may also comprise a geographic component. In block 205, the authentication server received metadata associated with the photographic image as part of the photographic image file. This metadata may include geographic information (e.g., where the image was captured). The authentication server may use the geographic information (e.g., coordinates) in various ways. For example, the image authentication application may request the user to indicate the location the photograph was taken (e.g., an address or name of location), and transmit that information along with application-recorded coordinate information to the authentication server as part of the photographic image file. The authentication server may then compare the recorded coordinate information with the address/point of interest information provided by the user to insure that the user has provided accurate geographic information. Alternatively, the authentication server may take coordinate information provided by the image authentication application to search for a corresponding address or nearby points of interest, and suggest these addresses/points of interest to the user. The user may be given the option to include geographic information with the authenticated image file or remove it, but is prohibited from modifying location information or adding unverifiable location information.

The authentication server also creates a resource location identifier associated with the authenticated image and/or the watermarked image so that third party viewers can visit the URL and confirm that the image has been authenticated. The resource location identified may be a web address or a shortened web address to direct a third party viewer to a webpage where they can view the authenticated image and/or the watermarked image. A copy of the authenticated image and/or the watermarked image can be uploaded to the web address so that third party viewers can view the authenticated image and/or compare an image they have received with the authenticated image at the web address. Finally, the authenticated image file, which may comprise any combination of the authenticated image, the watermarked image, and/or the authenticated metadata, is transmitted to the client device (block 225).

Finally, FIG. 5 provides a photographic image data authentication method from the perspective of a third party viewer. The third party viewer may receive an allegedly authenticated photograph from a user of the photographic data authentication system (block 305). The photograph may include a watermark that indicates that the photograph has been authenticated. However, it is possible that the user has falsely applied the watermark to an unauthenticated and/or edited image. To confirm that the image has, in fact, been authenticated and has not been edited in any way, the third party viewer may visit the web address associated with the watermarked image (block 310). The web address may appear on the watermarked image itself (for example, may be part of the watermark), or may be provided by the sender of the image, or may be embedded in the image such that clicking on the watermarked image will lead the user directly to the web address. In certain embodiments, the web address may be the full address, or a representation of the address (e.g., a QR code, or a tinyURL, or a bitly address). By visiting the web address, the third party viewer can verify that the allegedly authenticated photograph has, in fact, been authenticated.

Although the figures and examples discussed above were discussed with respect to photographic images, it should be understood that the systems and processes disclosed above may be used in conjunction with videos rather than still images. Further, as discussed above, authentication of images or videos may be performed by multiple authentication servers rather than a single authentication server.

It should be understood that while the figures have presented exemplary embodiments of the present systems and methods, revisions may be made to the disclosed systems and methods without departing from the scope of the present disclosure.

Where components or modules of the disclosed systems and methods are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Referring now to FIG. 5, computing module 400 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 400 might also represent computing capabilities embedded within or otherwise available to a given device. For example, a computing module might be found in other electronic devices such as, for example, digital cameras, portable media players, televisions/home theaters, in-car entertainment systems, video game consoles, video download or streaming devices, and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, random access memory (RAM) or other dynamic memory might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404. The computing module 400 might also include one or more various storage devices 410, which might include, for example, a magnetic tape drive, an optical disc drive, a solid state drive, removable storage media such as a CD/DVD, Compact-Flash memory, SD memory, or any other non-volatile memory.

Computing module 400 might also include a communications interface 420. Communications interface 420 might be used to allow software and data to be transferred between computing module 400 and external devices. Examples of communications interface 420 might include a modem or softmodem, a network interface (such as an Ethernet, network interface card, WiMedia, IEEE 802.XX, 3G or 4G LTE cellular network interface, or other interface), a communications port (such as for example, a USB port, IR port, RS232 port Bluetooth® interface, or other port), or other communications interface. Software and data transferred via communications interface 420 might typically be carried on signals, which can be electronic, electromagnetic (which includes optical) or other signals capable of being exchanged by a given communications interface 420. These signals might be provided to communications interface 420 via a channel 425. This channel 425 might carry signals and might be implemented using a wired or wireless communication medium. Some examples of a channel might include a phone line, a cellular link, an RF link, an optical link, a network interface, a local or wide area network, and other wired or wireless communications channels.

Computing module 400 might also include one or more user inputs 430. The user input allows for the user to enter commands to the computing module 400 and interact with it. Examples of user inputs might include a computer mouse, a keyboard, a touch-sensitive screen, a stylus, a mousepad, a joystick, an accelerometer, a gyroscope, a camera, a remote control, or any other user input mechanism.

The computer module 400 might also include one or more user output interfaces 440. The user output interfaces 440 might be used to interact with the user by presenting information or sensory outputs for the user. Examples of user output interfaces might include visual outputs, such as a display screen or monitor, or audio outputs, such as a speaker or headphone output.

In this document, the terms "computer readable medium" and "computer usable medium" are used to generally refer to media such as, for example, memory 408, storage unit 410, and channel 425. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:

1. A method of authenticating images received from a client device and providing authenticated image files, the method being implemented by an authentication server having one or more processors programmed to perform the method, the method comprising:

receiving, by the authentication server, an image file from the client device via a network;

responsive to receipt of the image file, obtaining, by the authentication server, authentication information, wherein obtaining the authentication information comprises determining, by the authentication server, a server-derived date and time, wherein the server-derived date and time includes a date and time at which the image file was received from the client device at the authentication server and is independent of a client-derived date and time determined at the client device;

obtaining, by the authentication server, first date and time information from an image authentication application executing at the client device and in communication with the authentication server, wherein the first date and time information comprises information obtained by the image authentication application that indicates a date and time that the image authentication application was opened at the client device;

determining, by the authentication server, one or more timing requirements have been satisfied, wherein the one or more timing requirements includes a requirement that the image file be received by the authentication server, as indicated by the server-derived date and time, within a predefined time period after the date and time that the image authentication application was opened at the client device;

generating, by the authentication server, an authenticated image file based on the image file and the authentication information responsive to at least the determination that the one or more timing requirements have been met;

receiving, by the authentication server, through a third party site different from the client device and the authentication server, a request for the authenticated image file or the authentication information; and responsive to the request, providing, by the authentication server, the authenticated image file or the authentication information.

2. The method of claim 1, wherein obtaining the authentication information further comprises:

obtaining, by the authentication server, geolocation information from an image authentication application executing at the client device and in communication with the authentication server, wherein the geolocation information comprises information that indicates a location at which the image file was created and is obtained by the image authentication application based on a geolocation function of the client device to prevent alteration of the geolocation information by a user of the client device.

3. The method of claim 1, the method further comprising:

obtaining, by the authentication server, first date and time information from an image authentication application executing at the client device and in communication with the authentication server, wherein the first date and time information comprises information obtained by the image authentication application that indicates a date and time that the image file was created at the client device; and determining, by the authentication server, one or more timing requirements have been satisfied, wherein the one or more timing requirements includes a requirement that the image file be received by the authentication server, as indicated by the server-derived date and time, within a predefined time period after the date and time that the image file was created at the client device, wherein the authenticated image file is generated based further on the determination that the one or more timing requirements have been met.

4. The method of claim 1, wherein receiving, through the third party site, the request for the authenticated image file or the authentication information comprises:

receiving, by the authentication server, the request from the third party site via a website hosted by the authentication server.

5. The method of claim 4, the method further comprising:

placing, by the authentication server, the authenticated image file at a file location linked to by a uniform resource indicator; and providing, by the authentication server, the uniform resource indicator to the client device in response to receipt of the image file from the client device, wherein receiving the request comprises receiving a request via the uniform resource indicator.

6. The method of claim 4, wherein providing the authenticated image file or authentication information comprises:
providing, by the authentication server, the authenticated image file or authentication information via the website hosted by the authentication server.

7. The method of claim 1, the method further comprising:
providing, by the authentication server, the authenticated image file to the client device, wherein the client device shares the authenticated image file through the third party site from which the request for the authenticated image file or the authentication information is received.

8. A system of authenticating images received from a client device and providing authenticated image files, the system comprising:
an authentication server comprising one or more hardware processors programmed to:
receive an image file from the client device via a network;
responsive to receipt of the image file, obtain authentication information, wherein to obtain the authentication information, the authentication server is programmed to determine a server-derived date and time, wherein the server-derived date and time includes a date and time at which the image file was received from the client device at the authentication server and is independent of a client-derived date and time determined at the client device;
obtain first date and time information from an image authentication application executing at the client device and in communication with the authentication server, wherein the first date and time information comprises information obtained by the image authentication application that indicates a date and time that the image authentication application was opened at the client device; and
determine one or more timing requirements have been satisfied, wherein the one or more timing requirements includes a requirement that the image file be received by the authentication server, as indicated by the server-derived date and time, within a predefined time period after the date and time that the image authentication application was opened at the client device;
generate an authenticated image file based on the image file and the authentication information responsive to at least the determination that the one or more timing requirements have been met;
receive through a third party site different from the client device and the authentication server, a request for the authenticated image file or the authentication information; and
responsive to the request, provide the authenticated image file or the authentication information.

9. The system of claim 8, wherein to obtain the authentication information, the authentication server is further programmed to:
obtain geolocation information from an image authentication application executing at the client device and in communication with the authentication server, wherein the geolocation information comprises information that indicates a location at which the image file was created and is obtained by the image authentication application based on a geolocation function of the client device to prevent alteration of the geolocation information by a user of the client device.

10. The system of claim 8, wherein the authentication server is further programmed to:
obtain first date and time information from an image authentication application executing at the client device and in communication with the authentication server, wherein the first date and time information comprises information obtained by the image authentication application that indicates a date and time that the image file was created at client device; and
determine one or more timing requirements have been satisfied, wherein the one or more timing requirements includes a requirement that the image file be received by the authentication server, as indicated by the server-derived date and time, within a predefined time period after the date and time that the image file was created at the client device, wherein the authenticated image file is generated based further on the determination that the one or more timing requirements have been met.

11. The system of claim 8, wherein to receive, through the third party site, the request for the authenticated image file or the authentication information, the authentication server is programmed to:
receive the request from the third party site via a website hosted by the authentication server.

12. The system of claim 11, wherein the authentication server is further programmed to:
place the authenticated image file at a file location linked to by a uniform resource indicator; and
provide the uniform resource indicator to the client device in response to receipt of the image file from the client device, wherein the request is received via the uniform resource indicator.

13. The system of claim 11, wherein to provide the authenticated image file or authentication information, the authentication server is programmed to:
provide the authenticated image file or authentication information via the website hosted by the authentication server.

14. The system of claim 8, wherein the authentication server is further programmed to:
provide the authenticated image file to the client device, wherein the client device shares the authenticated image file through the third party site from which the request for the authenticated image file or the authentication information is received.

15. The method of claim 1, the method further comprising:
obtaining, by the authentication server, first geolocation information from an image authentication application executing at the client device and in communication with the authentication server, wherein the first geolocation information comprises information obtained by the image authentication application that indicates a first geolocation at which the image authentication application was opened at the client device; and
obtaining, by the authentication server, second geolocation information from the image authentication application and in communication with the authentication server, wherein the second geolocation information comprises information obtained by the image authentication application that indicates a second geolocation at which the image file was created at the client device; and
determining, by the authentication server, one or more geographic requirements have been satisfied, wherein the one or more geographic requirements includes a requirement that the second location is within a predefined distance from the first location, wherein the authenticated image file is generated based further on the determination that the one or more geographic requirements have been met.

16. The method of claim 1, the method further comprising:
obtaining, by the authentication server, first geolocation information from an image authentication application executing at the client device and in communication with the authentication server, wherein the first geolocation information comprises information obtained by the image authentication application that indicates a first geolocation at which the image file was created at the client device; and
obtaining, by the authentication server, second geolocation information from the image authentication application and in communication with the authentication server, wherein the second geolocation information comprises information obtained by the image authentication application that indicates a second geolocation at which the image file was transmitted from the client device; and
determining, by the authentication server, one or more geographic requirements have been satisfied, wherein the one or more geographic requirements includes a requirement that the second location is within a predefined distance from the first location, wherein the authenticated image file is generated based further on the determination that the one or more geographic requirements have been met.

17. The method of claim 1, the method further comprising:
obtaining, by the authentication server, first geolocation information from an image authentication application executing at the client device and in communication with the authentication server, wherein the first geolocation information comprises information obtained by the image authentication application that indicates a first geolocation at which the image file was created;
obtaining, by the authentication server, second geolocation information from the image authentication application, wherein the second geolocation information comprises a user-defined location input by the user that indicates the user's assessment of where the image file was created; and
comparing, by the authentication server, the first geolocation information and the second geolocation information; and
determining, by the authentication server, that the second geolocation information is accurate based on the comparison, wherein the image file is authenticated based further on the determination that the second geolocation information is accurate.

18. The method of claim 1, the method further comprising:
obtaining, by the authentication server, first geolocation information from an image authentication application executing at the client device and in communication with the authentication server, wherein the first geolocation information comprises information obtained by the image authentication application that indicates a first geolocation at which the image file was created;
determining, by the authentication server, one or more suggested addresses or points of interest corresponding to the first geolocation;
transmitting, by the authentication server, the one or more suggested addresses or points of interest to the image authentication application; and receiving, by the authentication server, an identification of a user selection of at least one of the one or more suggested addresses or points of interest from the image authentication application, wherein the image file is authenticated based further on the user selection.

19. A method of authenticating images received from a client device and providing authenticated image files, the method being implemented by an authentication server having one or more processors programmed to perform the method, the method comprising:
receiving, by the authentication server, an image file from the client device via a network;
responsive to receipt of the image file, obtaining, by the authentication server, authentication information, wherein obtaining the authentication information comprises determining, by the authentication server, a server-derived date and time, wherein the server-derived date and time includes a date and time at which the image file was received from the client device at the authentication server and is independent of a client-derived date and time determined at the client device;
obtaining, by the authentication server, first geolocation information from an image authentication application executing at the client device and in communication with the authentication server, wherein the first geolocation information comprises information obtained by the image authentication application that indicates a first geolocation at which the image authentication application was opened at the client device; and
obtaining, by the authentication server, second geolocation information from the image authentication application and in communication with the authentication server, wherein the second geolocation information comprises information obtained by the image authentication application that indicates a second geolocation at which the image file was created at the client device;
determining, by the authentication server, one or more geographic requirements have been satisfied, wherein the one or more geographic requirements includes a requirement that the second location is within a predefined distance from the first location;
generating, by the authentication server, an authenticated image file based on the image file and the authentication information responsive to the determination that the one or more geographic requirements have been met;
receiving, by the authentication server, through a third party site different from the client device and the authentication server, a request for the authenticated image file or the authentication information; and
responsive to the request, providing, by the authentication server, the authenticated image file or the authentication information.

20. The method of claim 19, wherein obtaining the authentication information further comprises:
obtaining, by the authentication server, geolocation information from an image authentication application executing at the client device and in communication with the authentication server, wherein the geolocation information comprises information that indicates a location at which the image file was created and is obtained by the image authentication application based on a geolocation function of the client device to prevent alteration of the geolocation information by a user of the client device.

21. The method of claim 19, the method further comprising:

obtaining, by the authentication server, first date and time information from an image authentication application executing at the client device and in communication with the authentication server, wherein the first date and time information comprises information obtained by the image authentication application that indicates a date and time that the image file was created at the client device; and determining, by the authentication server, one or more timing requirements have been satisfied, wherein the one or more timing requirements includes a requirement that the image file be received by the authentication server, as indicated by the server-derived date and time, within a predefined time period after the date and time that the image file was created at the client device, wherein the authenticated image file is generated based further on the determination that the one or more timing requirements have been met.

22. The method of claim 19, wherein receiving, through the third party site, the request for the authenticated image file or the authentication information comprises:

receiving, by the authentication server, the request from the third party site via a website hosted by the authentication server.

23. The method of claim 22, the method further comprising:

placing, by the authentication server, the authenticated image file at a file location linked to by a uniform resource indicator; and providing, by the authentication server, the uniform resource indicator to the client device in response to receipt of the image file from the client device, wherein receiving the request comprises receiving a request via the uniform resource indicator.

24. The method of claim 22, wherein providing the authenticated image file or authentication information comprises:

providing, by the authentication server, the authenticated image file or authentication information via the website hosted by the authentication server.

25. The method of claim 19, the method further comprising:

providing, by the authentication server, the authenticated image file to the client device, wherein the client device shares the authenticated image file through the third party site from which the request for the authenticated image file or the authentication information is received.

26. A system of authenticating images received from a client device and providing authenticated image files, the system comprising:

an authentication server comprising one or more hardware processors programmed to:

receive an image file from the client device via a network;

responsive to receipt of the image file, obtain authentication information, wherein to obtain the authentication information, the authentication server is programmed to determine a server-derived date and time, wherein the server-derived date and time includes a date and time at which the image file was received from the client device at the authentication server and is independent of a client-derived date and time determined at the client device;

obtain first geolocation information from an image authentication application executing at the client device and in communication with the authentication server, wherein the first geolocation information comprises information obtained by the image authentication application that indicates a first geolocation at which the image authentication application was opened at the client device;

obtain second geolocation information from the image authentication application and in communication with the authentication server, wherein the second geolocation information comprises information obtained by the image authentication application that indicates a second geolocation at which the image file was created at the client device;

determine one or more geographic requirements have been satisfied, wherein the one or more geographic requirements includes a requirement that the second location is within a predefined distance from the first location;

generate an authenticated image file based on the image file and the authentication information responsive to at least the determination that the one or more geographic requirements have been met;

receive through a third party site different from the client device and the authentication server, a request for the authenticated image file or the authentication information; and responsive to the request, provide the authenticated image file or the authentication information.

27. The system of claim 26, wherein to obtain the authentication information, the authentication server is further programmed to:

obtain geolocation information from an image authentication application executing at the client device and in communication with the authentication server, wherein the geolocation information comprises information that indicates a location at which the image file was created and is obtained by the image authentication application based on a geolocation function of the client device to prevent alteration of the geolocation information by a user of the client device.

28. The system of claim 26, wherein the authentication server is further programmed to:

obtain first date and time information from an image authentication application executing at the client device and in communication with the authentication server, wherein the first date and time information comprises information obtained by the image authentication application that indicates a date and time that the image file was created at client device; and determine one or more timing requirements have been satisfied, wherein the one or more timing requirements includes a requirement that the image file be received by the authentication server, as indicated by the server-derived date and time, within a predefined time period after the date and time that the image file was created at the client device, wherein the authenticated image file is generated based further on the determination that the one or more timing requirements have been met.

29. The system of claim 26, wherein to receive, through the third party site, the request for the authenticated image file or the authentication information, the authentication server is programmed to:

receive the request from the third party site via a website hosted by the authentication server.

30. The system of claim 29, wherein the authentication server is further programmed to:

place the authenticated image file at a file location linked to by a uniform resource indicator; and provide the uniform resource indicator to the client device in response to receipt of the image file from the client device, wherein the request is received via the uniform resource indicator.

31. The system of claim 29, wherein to provide the authenticated image file or authentication information, the authentication server is programmed to:
provide the authenticated image file or authentication information via the website hosted by the authentication server.

32. The system of claim 26, wherein the authentication server is further programmed to:
provide the authenticated image file to the client device, wherein the client device shares the authenticated image file through the third party site from which the request for the authenticated image file or the authentication information is received.

33. The system of claim 26, wherein the authentication server is further programmed to:
obtain first date and time information from an image authentication application executing at the client device and in communication with the authentication server, wherein the first date and time information comprises information obtained by the image authentication application that indicates a date and time that the image authentication application was opened at the client device; and
determine one or more timing requirements have been satisfied, wherein the one or more timing requirements includes a requirement that the image file be received by the authentication server, as indicated by the server-derived date and time, within a predefined time period after the date and time that the image authentication application was opened at the client device, wherein the authenticated image file is generated based further on the determination that the one or more timing requirements have been met.

34. The system of claim 26, wherein the authentication server is further programmed to:
obtain first geolocation information from an image authentication application executing at the client device and in communication with the authentication server, wherein the first geolocation information comprises information obtained by the image authentication application that indicates a first geolocation at which the image file was created at the client device; and
obtain second geolocation information from the image authentication application and in communication with the authentication server, wherein the second geolocation information comprises information obtained by the image authentication application that indicates a second geolocation at which the image file was transmitted from the client device; and
determine one or more geographic requirements have been satisfied, wherein the one or more geographic requirements includes a requirement that the second location is within a predefined distance from the first location, wherein the authenticated image file is generated based further on the determination that the one or more geographic requirements have been met.

35. The system of claim 26, wherein the authentication server is further programmed to:
obtain first geolocation information from an image authentication application executing at the client device and in communication with the authentication server, wherein the first geolocation information comprises information obtained by the image authentication application that indicates a first geolocation at which the image file was created;
obtain second geolocation information from the image authentication application, wherein the second geolocation information comprises a user-defined location input by the user that indicates the user's assessment of where the image file was created; and
compare the first geolocation information and the second geolocation information; and
determine that the second geolocation information is accurate based on the comparison, wherein the image file is authenticated based further on the determination that the second geolocation information is accurate.

36. The system of claim 26, wherein the authentication server is further programmed to:
obtain first geolocation information from an image authentication application executing at the client device and in communication with the authentication server, wherein the first geolocation information comprises information obtained by the image authentication application that indicates a first geolocation at which the image file was created;
determine one or more suggested addresses or points of interest corresponding to the first geolocation;
transmit the one or more suggested addresses or points of interest to the image authentication application; and
receive an identification of a user selection of at least one of the one or more suggested addresses or points of interest from the image authentication application, wherein the image file is authenticated based further on the user selection.

* * * * *